Sept. 2, 1958 R. G. RIDEOUT 2,849,814
SLIDE VIEWERS

Filed July 5, 1955 3 Sheets-Sheet 1

INVENTOR
RICHARD G. RIDEOUT
BY Louis L. Gagnon
Noble L. Williams
ATTORNEYS

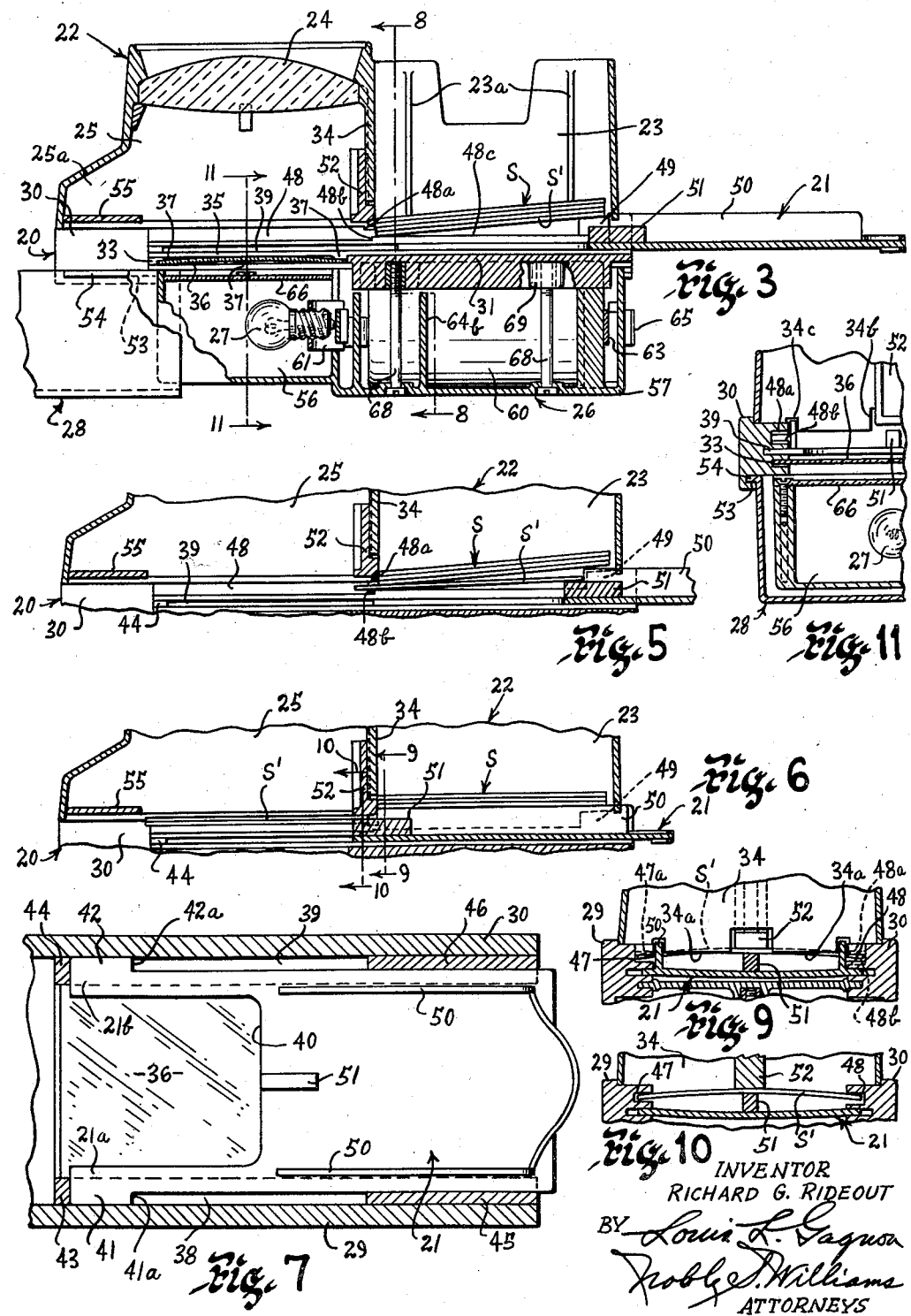

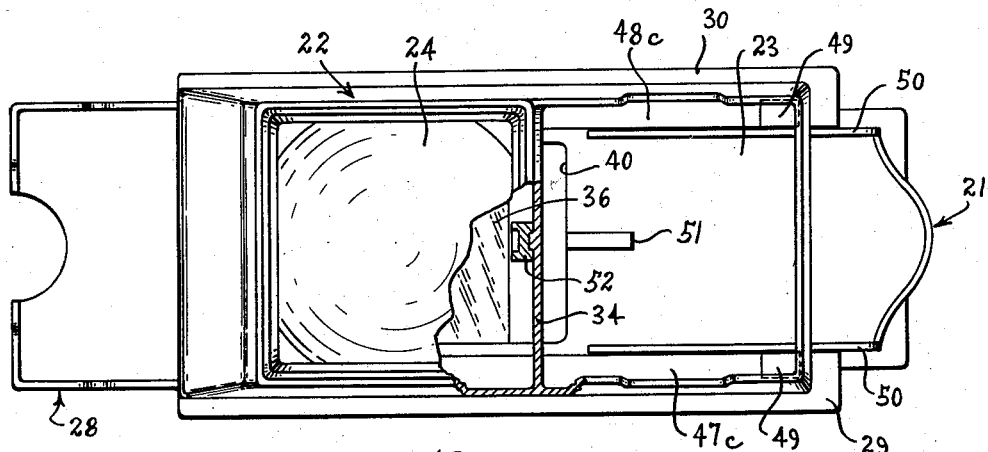
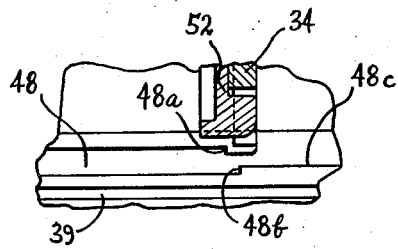
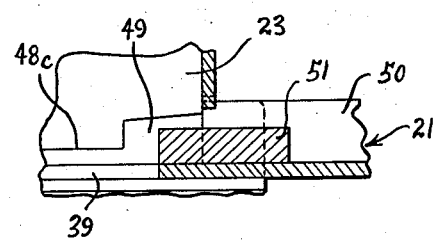
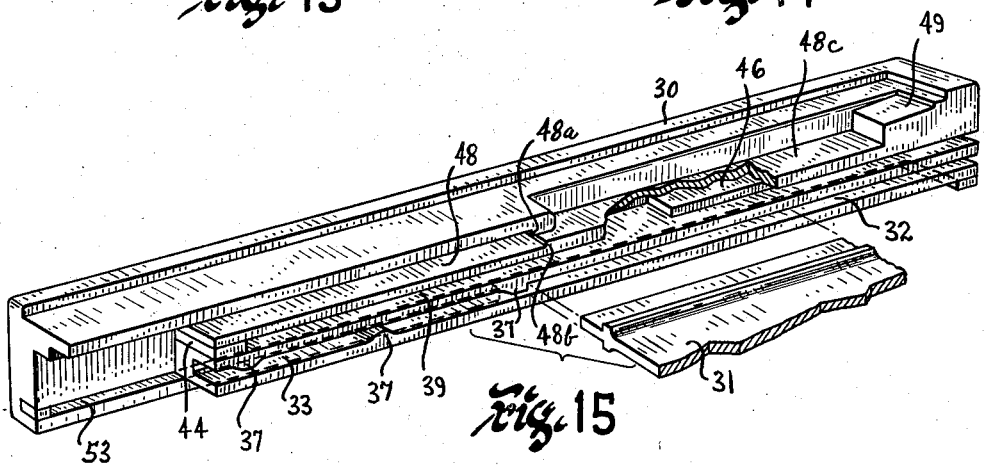

2,849,814
Patented Sept. 2, 1958

2,849,814
SLIDE VIEWERS

Richard G. Rideout, Cambridge, Mass.

Application July 5, 1955, Serial No. 519,724

5 Claims. (Cl. 40—78)

This invention relates to improvements in photographic slide viewing devices and has particular reference to novel means supporting a group of slides, means for sequentially transferring individual slides of said group of slides into register with optical viewing means and means for collecting said slides in a similarly arranged group thereafter.

Photographic slides of the so-called "Kodachrome transparency" type are generally mounted in 2" x 2" supporting frames of cardboard or other suitable material for easier handling during viewing and the projection thereof as well as to facilitate storing of the slides. When such slides are to be viewed, they are generally placed in a viewing device wherein the slides are individually located one after another in register with suitable optical viewing means which magnifies the picture portion thereof while the slide is being evenly illuminated from the rear by suitable light-diffusing means or the like.

Since in most instances it is desirable to view a number of slides which may be stacked in a particular sequential arrangement and relationship to each other and since for convenience said relationship should be retained upon completion of the viewing operation (so as to allow a subsequent viewing of the slides without the tedious work of sorting or re-arranging same), it is a principal object of this invention to provide an improved photographic slide viewing device which is compact and convenient to operate either while resting upon a table, or the like, or while being held in one hand and manipulated by the other, and which has means to support a group or stack of slides, a slide pushing mechanism to successively position the individual slides of such a group or stack in precise alignment with the optical viewing means of said device and means to thereafter re-group or re-stack said slides in their original sequence upon being ejected from the slide viewing position in the device.

Another object of the invention is to provide in a device of the character described novel means for consecutively positioning the individual slides of a group of slides in precise optically aligned relation with the optical viewing means thereof, means for intimately retaining each of said slides in said optically aligned relation during viewing of the slides (and during incidental handling of the device), and means for retaining each of said slides, after said viewing operation, in a position so as to permit ejection of said slide from said viewing position, and means for collecting and retaining said slides after being ejected in the same stacked sequential arrangement as originally provided.

Another object of the invention is to provide in a device of the character described improved means for selectively removing a slide to be viewed from the bottom of a group or stack of slides in such a manner that said slide will not stick to or become interlocked with the slide normally positioned in the stack and immediately above the bottom slide, regardless of slight irregularities or the like which may at times be encountered in the construction or condition of the cardboard supporting frames or mountings for said slides, particularly at the picture aperture defining edges thereof.

An important consideration in the construction and arrangement of the viewing device of the present invention is the fact that the stack of slides to be viewed therein, the individual slide being moved through the device and the slides being collected after viewing, for proper operation, depend considerably upon the effect of gravity thereon, such eliminating the necessity and cost of springs or the like for holding the slides in place. However, such a viewing device if only so arranged to work without spring holding means would be materially limited in its utility of an efficient and well constructed self-contained light source were not provided; for often it is impossible to find a convenient and adequate source of external illumination and even when such a source is available this source may not be suitably located. If such an external source is the sky, for example, the slides will not stay properly in their stacked arrangement while the device is held up for viewing, or even if the slides are manually held in place during viewing, it would be inconvenient but necessary after each viewing to lower the device in order to have the slide-changing mechanism thereof advance the next slide properly.

It is, accordingly, another object of the invention to provide in a device of the above character a convenient, compact and easily operated self-contained illuminating system having a light source and suitable means associated therewith for providing the user of the devices a clearly defined and well illuminated picture image regardless of the external light sources which may be available and regardless of the amount of external light which prevails in the room or other location at which the viewer is being used.

It is another object of the invention to provide simple and efficient means operatively associated with the slide pushing and guiding means of the device for preventing retrograde movement of a slide at the viewing aperture.

A further object of the present invention is to provide in such a device having a self-contained illuminating system means whereby said illuminating system may be readily removed from the remainder of said device so that the device may be used without said system, if and when a suitable external light source is available or even used with a lesser degree of satisfaction when the batteries thereof have become exhausted, said device having suitable means to assure at such times an even illumination of the slide positioned in the device for viewing.

Another important advantage which is obtained by the provision of the above-mentioned illuminating system is the fact that the viewing device may be conveniently rested upon the top of a table, or the like, or held in an equivalent position during viewing and this, it will be appreciated, is the same position as is most desirable for the device during the operation of the slide-changing mechanism thereof.

Another object is to provide an inexpensive, lightweight and readily portable slide viewing device of the above character which is simple to operate and which provides a rapid and convenient means for viewing groups or stacks of slides without change of sequence in the arrangement thereof.

Other objects and advantages of the invention will become apparent from the detailed description which follows when taken in conjunction with the accompanying drawings, and it will be apparent that many changes may be made in the details of construction and arrangement of parts shown and described without departing from the spirit of the invention as expressed in the accompanying claims. I, therefore, do not wish to be limited to the exact details of construction or the arrangement of parts shown and described herein except as recited in the appended claims, as the preferred forms of the device have been given by way of illustration only.

Referring to the drawings:

Fig. 3 is a longitudinal sectional view of the improved slide viewing device, said view having been taken on line 3—3 of Fig. 2 and looking in the direction of the arrows;

Fig. 5 is a fragmentary cross-section view, somewhat similar to Fig. 3 and illustrating a phase in the slide positioning operation of the device;

Fig. 6 is a cross sectional view generally similar to Fig. 5 but illustrating another phase of the slide positioning operation of the device;

Fig. 7 is a fragmentary horizontal sectional view taken substantially along section line 7—7 of Fig. 2 and looking in the direction of the arrows;

Fig. 9 is a fragmentary transverse sectional view taken along section line 9—9 of Fig. 6 and looking in the direction of the arrows;

Fig. 10 is a fragmentary transverse sectional view taken along section line 10—10 of Fig. 6 and looking in the direction of the arrows;

Fig. 11 is a fragmentary transverse sectional view taken along section line 11—11 of Fig. 3 and looking in the direction of the arrows;

Fig. 12 is a plan view of the device of Fig. 1, parts thereof being broken away to better show details of construction;

Figs. 13 and 14 are enlarged fragmentary sectional views of the slide-separating and slide-gripping parts of the device respectively; and Fig. 15 is an exploded view showing certain parts of the device of Fig. 1.

Figure 1:
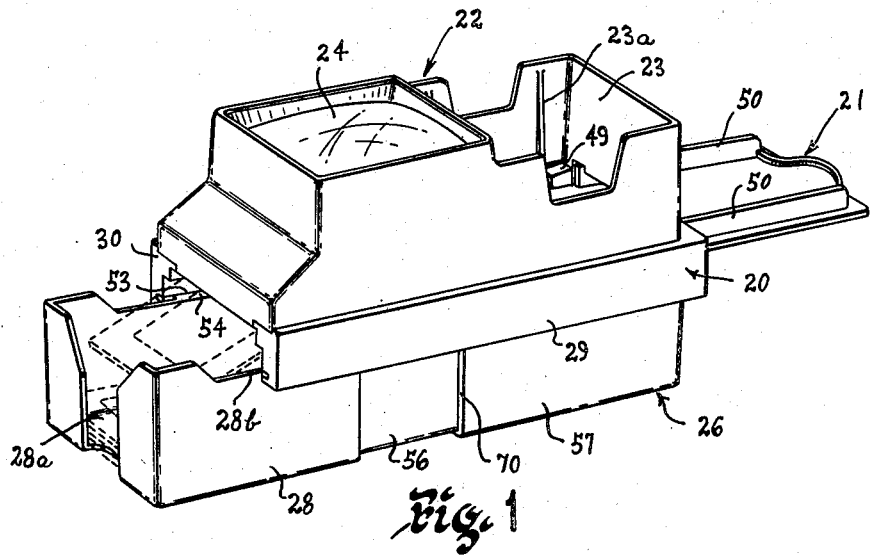
Fig. 1 is a perspective view of a slide viewing device embodying the present invention and having the parts thereof shown in positions of use.

Referring to the drawings in detail and wherein like characters of reference designate like parts throughout the several views, a slide viewing device embodying the present invention is shown and comprises generally a relatively flat elongated built-up central base or main supporting portion 20 having a slide pusher 21 slidably mounted therein, a relatively thin walled multi-chambered housing portion 22 cemented or otherwise secured upon the upper side of said base, a detachable lower housing portion 26 and a slide-collecting receptacle 28 secured at the lower side thereof. Said upper housing portion 22 comprises a first or slide-receiving chamber 23 which is adapted to receive a stack of slides about to be viewed and a second or viewing chamber 25 having a relatively large magnifying lens, or the like, 24 mounted therein for viewing slides when optically aligned therewith. The detachable lower housing portion 26 which will be described in greater detail hereinafter has a light source 27 and associated means mounted therein so as to be aligned with the second or viewing chamber 25 and the magnifying lens 24 therein.

Figures 2, 8:
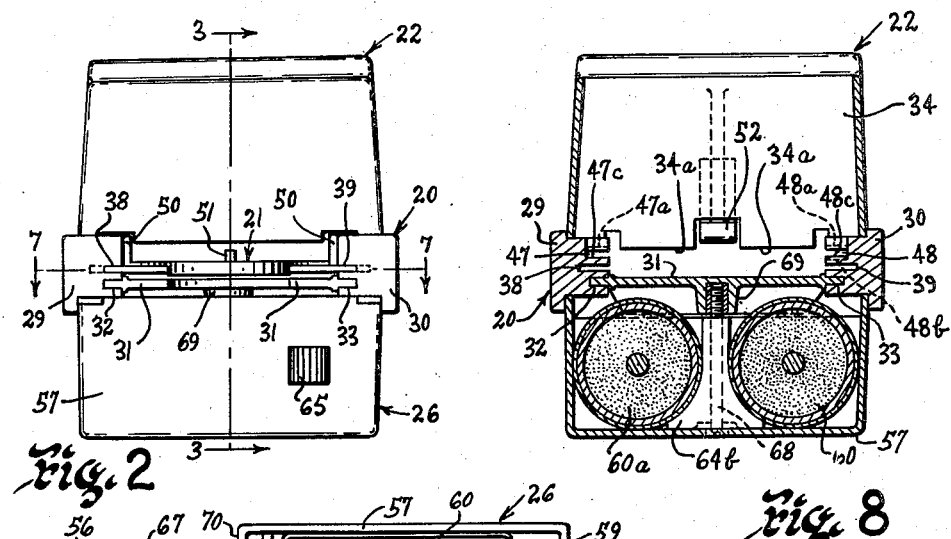
Fig. 2 is an end elevational view of the device of Fig. 1.
Fig. 8 is a transverse vertical sectional view of the device taken along section line 8—8 of Fig. 3 and looking in the direction of the arrows.

The base portion 20 of the device, which is molded, cast or otherwise formed of plastic or other suitable materials is preferably formed in three parts comprising a pair of elongated side rails 29 and 30 which are held when assembled in fixed spaced relation to each other by means of a relative wide flat spacer member 31 (see Figs. 2, 3, and 8) cemented or otherwise secured thereto. Each side rail has a series of longitudinally extending inwardly facing channels formed therein and one pair of these channels, 32 and 33, in the side rails 29 and 30, respectively, is arranged to receive the spacer member 31. One slide rail 30 is shown in greater detail in Fig. 15.

Said spacer member 31, however, is as shown in Fig. 3, of a length sufficient to extend only from the right-hand end of the rails 29 and 30 beneath the slide-receiving chamber 23 to a point slightly beyond a vertical transverse partition 34 which is formed between chamber 23 and 25 in the upper housing portion 22. In this manner, there is provided an illumination opening or viewing aperture 35 between the rails 29 and 30 and beneath the second or viewing chamber 25. Aperture 35 is provided with a translucent plastic window or diffusing screen 36 which has its opposite edges fitting within the remaining portions of channels 32 and 33. These edge portions of the screen are each detachably secured in place by the slightly flexed condition of the screen and by means of three spaced protruding lugs or the like 37 formed integral with side rails and projecting upwardly or downwardly respectively into the channel 32 or 33, as best illustrated in Fig. 3. Because of the flexing of the screen, it may easily be slipped into place through the adjacent open ends of the channels 32 and 33.

A second pair of longitudinally extending guideways 38 and 39 in side rails 29 and 30 respectively are formed directly above guideways 32 and 33. These guideways 38 and 39 are adapted to slidably receive the opposed edges of the slide pusher 21, mentioned above. The pusher 21, which is constructed of a material and in a manner similar to that mentioned for base 20 is of considerable length and width. It has an enlarged opening 40 (see Fig. 7) formed in the inner or forward end thereof and this opening 40 is of nearly the same area as that of the viewing aperture 35, so as to allow light for illuminating a slide to pass through the translucent window 36 and through opening 40 and then through a slide positioned for viewing even when said slide pusher is fully advanced into the slide viewing device as illustrated in Fig. 7.

Spaced end portions 21a and 21b of the slide pusher 21 adjacent opposite sides of the opening 40 are, however, provided at their outer sides and adjacent their forward extremities with enlarged shoulder areas 41 and 42, respectively, which are adapted to function as limiting means to limit the extent of inward and outward sliding movement of slide pusher 21 in guideways 38 and 39. It can be seen in Fig. 7 that inwardly sliding movement of the slide pusher 21 will be limited by abutment of the forward edges of said spaced end portions 21a and 21b carrying shoulder means 41 and 42 with stop elements 43 and 44 which are cemented or otherwise fixedly secured in the inner ends of channels 38 and 39. Outward sliding movement of slide pusher 21, on the other hand, will be limited by engagement of the narrower rearward edges 41a and 42a of these shoulder areas 41 and 42 with stop means in the form of a pair of elongated filler strips 45 and 46 which are cemented or otherwise fixedly secured within the opposite or outer ends of guideways 38 and 39. Each strip, 45 or 46, it will be noted, is only partly as wide as the guideway in which it fits and thus there is still provided therein sufficient room for guiding the adjacent edge portion of the pusher 21.

A third pair of guideways 47 and 48, which are of a shorter length and are adapted to receive slides which are being viewed in the device, are also provided in the side rails 29 and 30, respectively, directly above the guideways 38 and 39. They extend only beneath the viewing chamber 25, as best shown in Figs. 3 and 5, and terminate at their inner discharge ends directly above the stops 43 and 44. The opposite or receiving ends of these guideways 47 and 48 terminate at shoulder portions, which will be presently described, and which together define a restricted passageway communicating with the first or slide-receiving chamber 23. Guideways 47 and 48 are provided at their receiving ends, respectively, with downwardly extending shoulder portions 47a and 48a which restrict the communicating passageway extending from the chamber 23 to a width slightly greater than the thickness of a single slide. This permits only one slide at a time to enter the communicating guideway from chamber 23. The shoulder portions 47a and 48a further function to prevent a slide, when fully positioned for viewing beneath lens 24 and within said guideways 47 and 48 and held against the upper surfaces thereof by the pusher 21, from being moved toward the receiving chamber 23 by retraction of the pusher 21 in a manner which will be discussed in greater detail hereinafter.

In order to more fully understand the functioning of the parts of the device discussed thus far, a description of the slide transferring and viewing operations will now be given. In Fig. 3, a group or stack of slides S is shown positioned within the receiving chamber 23, and the slide pusher 21 has been pulled outwardly until the rearwardly facing edges 41a and 42a of the enlarged shoulder areas 41 and 42 are in abutting engagement respectively with the stop means 45 and 46 (Fig. 7). The stack of slides S will then assume the slightly inclined position illustrated in Fig. 3 with the rear corners of the lowermost slide S' of said stack of slides resting upon a pair of small supporting blocks 49 which are provided in each outer or rear corner of the chamber 23, and with the forward corners of this slide S' resting upon spaced guide rail surfaces 47c and 48c extending horizontally from the communicating guideway into the receiving chamber 23. The forward corners of slide S' at this time are in alignment with the openings into channels 47 and 48. From Figs. 1 and 3, it can be seen that the inner side walls of the receiving chamber 23 are each provided with a pair of vertically extending tapered guide ribs 23a which cause the lowermost slides of stack S to be automatically aligned in a sidewise direction with communicating passageway opening into said guideways 47 and 48.

Inwardly directed movement of the slide pusher 21 from the position shown in Fig. 3 will cause the leading edges of a pair of elongated upstanding ribs 50, which are preferably integrally formed upon the upper surface of the slide pusher 21 adjacent opposite sides thereof, to engage the rear edge of lowermost slide S'. The ribs 50 are so transversely positioned upon the slide pusher 21 as to be disposed between the side rails 29 and 30 as the pusher is moved inwardly and are of such a height as to extend only slightly above the tops of supporting blocks 49. Thus, they are only of a height sufficient to engage the rear edge of the lowermost slide S' for moving same forwardly. (See also Fig. 14.)

Continued inwardly directed movement of slide pusher 21, as shown in Fig. 5, will cause the forward edge of lowermost slide S' to enter the guideways 47 and 48, at which time the rear edge of the slide will be moved forwardly of and drop from blocks 49. The rear edge of the slide will then be supported only upon an integral upstanding spacer member 51 which is centrally located upon the upper surface of slide pusher 21. This spacer 51 is of a lesser height than ribs 50 and extends somewhat forwardly of the leading edges of ribs 50. The bottom slide S' will then be separated from the remainder of the stack S and since ribs 50 are of a height only sufficient to engage the edge of the bottom slide S' as pusher 21 starts forwardly, the ribs will ride under the rear edge of the next-to-bottom slide and will support the remainder of the stack S in an inclined manner as shown in Fig. 5. It is to be noted that by separating slide S' from the remaining slides of the stack S in the manner just described, the slides being forwarded one by one will not be permitted to stick together or interlock at the edges of the picture portions of the cardboard mounts as might otherwise happen.

As the slide pusher 21 reaches its forward or innermost position, the slide S' in guideways 47 and 48 will move into register with the illumination aperture 35 and diffusing screen 36, as shown in Fig. 6, and the remaining slides of stack S will be forced upwardly to an out-of-the-way position where they will rest upon the upper horizontal edges of said ribs 50; since they cannot move upwardly due to engagement of the forward edges thereof with the transverse partition 34. Small openings 34c (see Fig. 11) are provided in the partition 34 for allowing the ribs 50 to pass therethrough while the pusher 21 is being moved forwardly.

It is a particular feature of this invention to provide novel means of locking each successive bottom slide S' in its registered position above diffusing screen 36. This is accomplished by providing at the communicating passageway leading from the receiving chamber 23 into guideways 47 and 48 a height only slightly greater than the thickness of the cardboard slide mount mentioned above. Additionally, the partition 34 is designed so as to have its lower edge 34a (see Fig. 9) substantially in the same plane as the upper surfaces of guideways 47 and 48, and to function therewith the central spacer member 51 on pusher 21 is formed of such a height as to normally extend slightly above this lower edge 34a (see Fig. 11). To allow this, a small recess 34b is provided centrally in the lower edge of partition 34.

It can, therefore, be seen that as the rear portion of inclined slide S' and the spacer 51 supporting same approach the communicating passageway in order to allow said rear portion of the slide S' to pass beneath the partition 34, the center portion of the pusher 21 carrying spacer 51 will be caused to flex in a downwardly direction. Immediately after the rear edge of slide S' has passed beyond partition 34 (at which time the spaced ends 21a and 21b of pusher 21 will have abutted stop elements 43 and 44), the tension in pusher 21 will tend to cause the rear edge of slide S' to move upwardly. A locating foot 52, however, which is centrally cemented or otherwise secured within viewing chamber 25 to the partition 34, is so vertically disposed relative to the top surface of spacer 51 and slightly above partition surface 34a as to be contacted by the upper rear central surface portion of slide S' while allowing said slide to be slightly upwardly flexed; its outer side edges at such time engaging the upper surfaces of the guideways 47 and 48. Thus, the foot 52 will limit the extent of upward flexing of the central portion of slide S' caused by downwardly flexed spacer 51 and will simultaneously cooperate with spacer 51 in gripping the rear edge of slide S'. Thus, the rear edge of each slide while being viewed through lens 24 will be intimately held (see Fig. 10) between foot 52 and spacer 51 by the flexed pusher 21 and because of the flexed condition of the slide will have its side edges pressing upwardly against guideways 47 and 48. Locating the bottom edge of foot 52 and cementing the foot in this position, of course, would be a factory adjustment which need be done only once in accordance with the thickness of the slides it is adapted to accommodate.

The thickness of the frame portion of a conventional cardboard mounted slide, such as S', is for example approximately .042 inch. The device, on the other hand, is constructed so as to have a clearance of approximately .030 inch between the cemented foot 52 and the spacer 51 when the slide pusher 21 is in an unflexed condition. Thus, when a slide is in position between the spacer 51 and foot 52, the slide pusher 21 will be downwardly flexed approximately .012 inch and will provide the clamping tension desirable. (Of course, a different set spacing would be provided if a different thickness of slides were to be accommodated in the device.) By so locking each slide in precise alignment with the viewing aperture 35 and while the pusher 21 is in its innermost or out-of-the-way position, said slide will be retained in place during viewing thereof and without danger of its becoming dislocated by handling or passing of the viewing device from one person to another.

Since the slide S', when in the position shown in

Fig. 6, is located forwardly of the shoulder portions 47a and 48a retraction or outward movement of pusher 21 may cause slide S' to abut these shoulder portions, and same will prevent the slide from returning to the receiving chamber 23 while the pusher 21 and spacer member 51 thereon are being returned to their outermost position. However, when the locked condition of the slide S' is released, said slide will be free and will drop onto the lower surfaces of the guideways 47 and 48. (See also Fig. 13.)

In order to prevent slide S', which is at this time free to slide upon the lower surfaces of guideways 47 and 48, from accidentally sliding back into the receiving chamber 23 because of incidental tilting of said device during handling, the lower surface of guideway 48 is formed so as to provide a shoulder or stop means 48b (see Fig. 3) against which the rear edge of said slide S' will abut. By so forming guideway 48 with shoulder 48b, the height thereof will be substantially equal to twice the thickness of a slide whereas the height of guideway 47 which is not so shouldered, will be approximately equal to one and one-half times the thickness of a slide or even a little less. It can, therefore, be seen that by differently constructing the guideways 47 and 48 in the manner just described, with different spacings between the upper and lower surfaces thereof, one guideway 48 will prevent undesired rearward travel of the released slide S' (due to shoulder 48b) and the other guideway 47 being of a height less than the thickness of two slides, will make it impossible to accidentally push a second slide into the viewing position without simultaneously ejecting the slide which is already there.

The positioning of a second slide from the stack of slides S for viewing may then be accomplished by pulling out slide pusher 21 to the position shown in Figs. 1 and 3 and repeating the operation. As the second slide enters guideways 47 and 48, its forward edge will engage the rear edge of the preceding slide and eject same therefrom.

The pairs of guideways 32 and 33, 38 and 39, 47 and 48 terminate at positions adjacent the forward edge of the viewing aperture 35, and this will allow each slide as it is ejected from guideways 47 and 48 to drop downwardly therefrom. However, a slide-collecting receptacle 28 is provided with a pair of flanges 54 which are slidably mounted in another pair of short guideways 53 formed in the lower portions of side rails 29 and 30 (see Figs. 3 and 11). Guideways 53 extend only beneath the viewing chamber portion of the device but are of a sufficient length to allow these outwardly directed flanges 54 integral with opposite side edge portions 28b of the receptacle, along approximately the inner half of each, to slide outwardly to the position shown in Fig. 1. A slotted finger opening 28a is provided in the outer end of receptacle 28 to permit the viewed stacked slides to be easily removed therefrom. A part of the upper housing 22 at chamber 25 extends somewhat beyond the viewing aperture 35, as indicated at 25a, and this part serves to overlie the ends of guideways 47 and 48. In order to prevent stray light from entering this extended part of chamber 25 which would tend to interfere with or impair the picture being viewed, a horizontal partition 55 extends between the side walls of chamber 25 and inwardly from the end thereof and the ends of rails 29 and 30 so as to define the viewing aperture 35.

It can be seen from the foregoing description by stacking the slides S in a desired sequence to be viewed that each of said slides may be viewed and thereafter restacked in receptacle 28 in the same order as previously provided, simply by operation of slide pusher 21 back and forth. It may be desirable to position a blank side at the top of the stack S being viewed and this may be used to eject the last picture slide from the viewing position; whereupon the blank slide could be left in the device when not in use and ejected by the first slide when the device is used again. Alternatively, it should be appreciated that the last slide, when released from the clamping action of the foot 52 and spacer 51, as described previously, may be removed from the device merely by tilting the viewer so that this slide will gravitate forwardly.

In viewing photographic slides with devices of the above type, particularly while indoors, the external lighting conditions which are available often are insufficient to provide ideal or even adequate viewing conditions, even though the device so far described may be used under such conditions. In order to overcome this objection, there is additionally provided for the device, as previously mentioned, a detachable lower housing 26 which is molded, cast or otherwise formed of a suitable plastic material or the like and preferably divided into two parts, a light source chamber 56 and a battery chamber 57 separated by partition means formed by two spaced transverse walls 56a and 57a. The light source chamber 56 has the previously mentioned light source 27 mounted therein and this is a filament bulb of a type readily available, such as a conventional two-cell flashlight bulb or the like. The battery chamber 57 is arranged to house a pair of dry cell batteries 60 and 60a of standard flash light size in side-by-side but oppositely facing relation.

Figure 4:
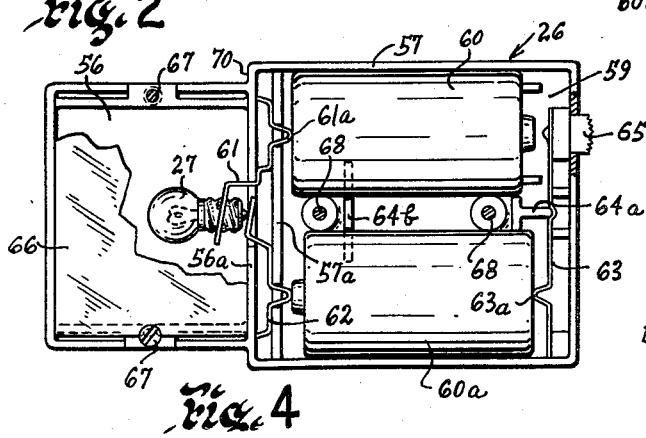
Fig. 4 is a top plan view of the illuminating system of the device of Fig. 1 when same is removed from the device and showing portions thereof partially broken away.

A circuit for connecting said light source and batteries comprises a first ribbonlike strip 61 of flexible electrically conductive material, such as copper or an alloy thereof, one end of which is provided with a hole or opening into which is threaded the base of the light source. The remainder of strip 61 is bent so as to be firmly retained between double walls 56a and 57a and to provide a battery contact portion 61a adapted to be engaged by battery 60 in the manner shown in Fig. 4. A second flexible strip-like conductor 62 is formed at one end so as to engage the center terminal of light source 27 and has the remainder thereof shaped so as to fit between walls 56a and 57a and contact at 62a one terminal of battery 60a. The case portion of battery 60a is similarly contacted at a point 63a by a third flexible strip-like conductor 63 which extends transversely between an upstanding battery spacing member 64a, integrally formed with lower housing 26, and spaced projections extending from the end wall of chamber 57. This strip has a free end thereof connected to a push button 65, said button extending outwardly through an opening in the end wall of the chamber 57. Inward movement of push button 65 thus will cause the free end portion of conductor 63 adjacent thereto to flex and contact the center terminal of battery 60 and this will provide a closed circuit to energize the bulb 27. A second integral battery spacing member is provided at 64b.

A translucent screen or light-diffusing window 66 is secured over the light source chamber 56 by means of screws 67 and in order to increase the intensity of the light transmitted by the screen, it is desirable to paint the inner walls of chamber 56 with a white or light-reflecting material.

The lower detachable housing 26 is attached to the underside of the base 20 by means of elongated screws 68 which extend upwardly through the central portion of chamber 57 and are threadedly attached in a pair of downwardly extending bosses 68 integrally formed upon the underside of spacer 31.

It is to be noted in Fig. 3 that the light-diffusing window 66 is positioned in alignment with the light aperture 35 and light-diffusing screen or window 36 when the lower housing 26 is attached to base 20. Thus, light emitted from the light source 27 will pass upwardly through both windows 66 and 36 to light the picture portion of a slide. The use of two diffusing screens together is not objectionable, but, on the other hand, has been found in practice to provide a very uniform intensity of illumination over all portions of the lighted field behind the picture being viewed. However, by simply removing screws 68, the lower housing 26 may be readily detached from the slide viewing device for purposes of replacing the light source, or the batteries, or, if desired, said slide viewing device may be effectively used independently of the illuminating system by directing the light-diffusing window 36 thereof towards a suitable external light source.

In order to provide as compact and readily portable device as possible, the slide-collecting receptacle 28 is constructed of a size and shape so as to be telescoped over the light source chamber 56 of the lower housing 26 when not in use. In closed position, the outermost end of receptacle 28 will be substantially flush with the end of side rails 29 and 30. At this time, the opposed end of the receptacle will substantially abut the shoulder portions 70 of housing 26. Of course, at this time, pusher 21 will be in its inner position as shown in Fig. 6. While the viewing device can be operated with the receptacle 26 in its closed position, in which case the slides would be ejected over the top of the end of the receptacle, it is preferable to pull the receptacle to its outer position before starting to use the device for this will insure proper collection and sequential stacking of the viewed slides.

While it has been pointed out previously that fixed blocks 49 serve to support the rear corners of the stack of slides in compartment 23 in an inclined position so that the rear edge of the lowermost slide thereof will gravitate downwardly when initially pushed by rib means 50 on pusher 21 and thus avoid undesired interlocking between edges of adjacent sides, it should also be noted that fixed blocks 49, in supporting the stack of slides in such an inclined position serve the additional function of enabling the forward or leading edge of slightly bent, warped or irregular slides when included in the stack to more positively and easily enter the communicating passageway leading to the slide-viewing position.

From the foregoing description, it will be seen that simple, efficient and economical means have been provided for accomplishing all of the objects and advantages of the invention.

Having described my invention, I claim:

1. A photographic slide viewing device of the character described comprising a base having a light aperture therein, a light-diffusing screen carried by said base adjacent said aperture, a housing carried by said base having a partition subdividing said housing into a slide-receiving compartment, optical viewing means in said viewing compartment aligned with said aperture, said receiving compartment being adapted to receive a group of horizontally disposed slides arranged in a vertically stacked condition therein, guide means on said base for supporting and directing the forward edge of the lowermost slide of said stack while same is being moved forwardly beneath said partition and into a viewing position in alignment with said optical means, fixed means in the rear part of said receiving compartment for supporting the rear edge of the lowermost slide of said stack in an elevated position appreciably above the forward edge thereof, a slide pusher slidably carried by said base and having upwardly extending contact means thereon arranged to engage, during forward movement of said pusher, the rear edge of said lowermost slide, whereby initial forward movement of said pusher will cause said lowermost slide to move forwardly slightly and away from said fixed means and thereafter gravitate downwardly away from the remaining slides of said stack, supporting means on said pusher for supporting at such time the rear edge of said lowermost slide in a lower elevated position relative to its forward edge, continued forward movement of said pusher causing said upstanding contact means to move beneath the remaining slides of said stack and elevate said stack slightly while said lowermost slide is being moved into said viewing compartment, and means fixed relative to said base for engaging the rear edge of said lowermost slide when in said viewing compartment and for preventing retrograde movement thereof as said pusher is retracted.

2. A photographic slide viewing device of the character described comprising a base having a light aperture therein, a light-diffusing screen carried by said base adjacent said aperture, optical viewing means carried by said base above and aligned with said aperture, a pair of guideways at opposite sides of said aperture for slidably receiving and retaining opposite edge portions of a slide when in a viewing position adjacent said aperture, a slide-receiving compartment on said base adapted to receive and accommodate a group of horizontally disposed slides in a vertically stacked arrangement therein, a communicating passageway for allowing the lowermost slide of said stack to be moved from said slide-receiving compartment into said viewing position with said opposite edge portions of said slide disposed in said guideways, a slide pusher carried by said base having means thereon for moving a slide from said compartment into said viewing position and for simultaneously upwardly flexing said slide so as to cause said opposite edge portions thereof to bear against the upper surfaces of said guideways when said slide is in said viewing position, and fixed abutment means supported by said base and disposed immediately rearwardly of a rear edge portion of said upwardly flexed slide in said viewing position for precluding any substantial rearward movement of said slide as said pusher is moved rearwardly for operatively engaging the next subsequent slide to be viewed.

3. A photographic slide viewing device of the character described comprising a base having a light aperture therein, a light-diffusing screen carried by said base adjacent said aperture, optical viewing means carried by said base above and aligned with said aperture, a slide-receiving compartment on said base at one side of said aperture adapted to retain a group of horizontally disposed slides in a vertically stacked arrangement therein, a flexible slide pusher having opposite side edge portions thereof slidably positioned in guideways in said base, fixed means on said pusher for moving a slide from said compartment into a slide viewing position adjacent said aperture and simultaneously upwardly flexing the center of said slide as said pusher is moved from an outer to an inner position, fixed means on said base arranged to cooperate with said fixed means on said pusher and located intermediate said side edge portions thereof for flexing the center of said pusher downwardly so as to automatically releasably grip said slide between said fixed means on said base and on said pusher as said slide moves into said slide viewing position, abutment means on said base immediately rearwardly of the rear edge of said slide at said viewing position for precluding any appreciable rearward movement of said slide as said pusher returns to its outermost position, an initial outward movement of said pusher serving to release the gripped portion of said slide so as to be freely movable in said guideways, and fixed stop means adjacent the lower surface of one of said guideways immediately rearwardly of said slide at said viewing position for preventing rearward movement of said slide after said slide has been released by said pusher.

4. A photograph slide viewing device having a base with a light aperture therein, optical means for viewing a slide spanning said aperture, a slide-receiving compartment on said base at one side of said aperture, a partition wall between said compartment and said optical means with clearance thereunder for passage of a slide from said compartment to a position of alignment with said aperture, opposed horizontal guide channels in said base arranged to receive side margins of a slide moving through said clearance, horizontal rails in said compartment aligned respectively with said channels, opposed horizontal guide grooves in said base below said channels and rails, a slide pusher having side margins slidable in said grooves, said pusher including a flexible plate, longitudinal ribs projecting upward on said plate adjacent to said side margins, and supporting blocks in the rear corners of said compartment arranged to support the rear edge of the lowermost slide in said compartment at a level slightly below the top of said ribs when the front corners of said lowermost slide are resting on said rails adjacent to said clearance, whereby forward movement of said pusher from its retracted position causes the forward ends of said ribs to push the lowermost slide off said supporting blocks and through said clearance while said ribs move under the margins of the next slide above the lowermost to elevate it above the level of said clearance.

5. Apparatus as described in claim 4, said slide pusher having a spacer block projecting upward on said plate midway between said ribs and slightly forward of the front ends of said ribs, said spacer block having a height slightly less than that of said ribs but projecting up to a level above that of said guide channels, and a foot secured to the front face of said partition wall just above the middle of said clearance, whereby when said pusher moves forward from its retracted position said spacer block moves under the midpoint of the rear margin of the lowermost slide in said compartment and remains under said midpoint as said ribs push the lowermost slide through said clearance, the forward portion of said plate being flexed downward until the slide has passed through the clearance and said midpoint of its rear margin is pinched between said spacer block and said foot.

References Cited in the file of this patent

UNITED STATES PATENTS

| | | |
|---|---|---|
| 2,213,779 | Young | Sept. 3, 1940 |
| 2,260,660 | Darwin | Oct. 28, 1941 |
| 2,533,441 | Estes | Dec. 12, 1950 |
| 2,604,814 | Smith | July 29, 1952 |
| 2,617,218 | Antos | Nov. 11, 1952 |
| 2,645,869 | Cook | July 21, 1953 |